Oct. 15, 1946.                    T. M. LINVILLE                    2,409,503
                               DYNAMOELECTRIC MACHINE
                                 Filed Sept. 28, 1944
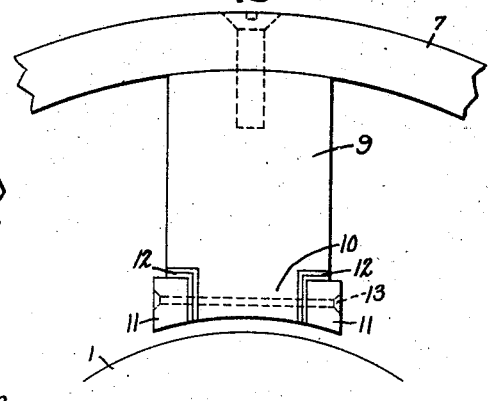
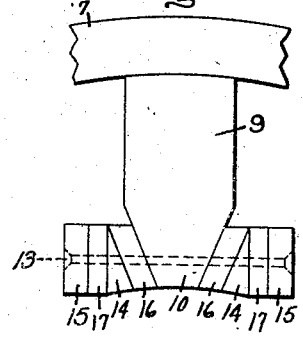
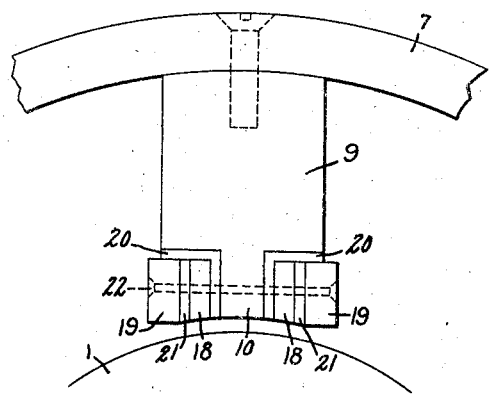
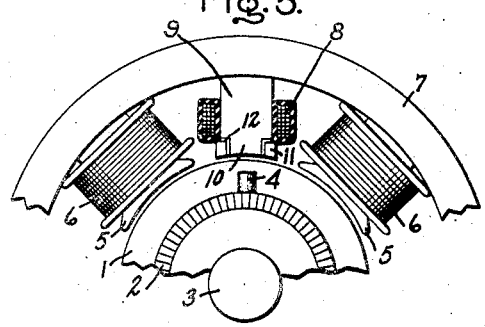
Inventor:
Thomas M. Linville,
by Harry E. Dunham
His Attorney Patented Oct. 15, 1946

2,409,503

UNITED STATES PATENT OFFICE 2,409,503

DYNAMOELECTRIC MACHINE

Thomas M. Linville, Schenectady, N. Y., assignor to General Electric Company, a corporation of New York Application September 28, 1944, Serial No. 556,137

8 Claims. (Cl. 171—228)

My invention relates to dynamoelectric machines of the commutating type and more particularly to this class of machine provided with commutating pole pieces.

An object of my invention is to provide an improved commutating type dynamoelectric machine.

Another object of my invention is to provide an improved commutating field excitation system for a dynamoelectric machine.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 represents an end view of the core of a commutating pole piece provided with an embodiment of my improved commutating pole piece construction; Fig. 2 represents another modification of my improved commutating pole piece core construction; Fig. 3 shows a further modification of my invention; Fig. 4 illustrates a still further embodiment of my invention; and Fig. 5 is an end elevational view, partly broken away, of a dynamoelectric machine provided with an embodiment of my invention.

Referring to the drawing, I have shown a dynamoelectric machine of the commutating type provided with a rotatable member or armature 1 with a conventional direct current winding connected to a commutator 2 and mounted upon a shaft 3. Current is adapted to be transferred from an outside stationary conductor to the rotatable member commutator 2 by any suitable brush rigging, such as through a carbon brush 4, which is adapted to commutate the current from the bars of the commutator 2. In order to provide the desired excitation to the machine, the stationary member of the machine is provided with main salient pole pieces 5 excited by field exciting windings 6 mounted on a magnet frame 7 and a commutating voltage is adapted to be induced in the coils of the armature winding undergoing commutation by the brushes by a commutating pole having a field exciting winding 8 arranged about a radially extending pole piece core 9 of magnetic material. The number of commutating pole pieces for a machine may be varied according to the number of brush sets and may include one or more of these pole pieces according to the commutating requirements of the machine. In the construction shown in Figs. 1 and 3, the commutating pole piece is provided with a pole tip formed by an integral magnetic material core portion having a transverse width less than that of the main core portion in order to provide a magnetic flux distribution in the air gap which varies from a minimum adjacent the outer edges of the pole to a maximum at the center of the pole piece. To obtain the desired induced voltage in the coils of the armature winding which are undergoing commutation, it is desirable that the maximum commutating voltage should be induced in the coil or coils short circuited by the current collector 4 and to have a small commutating voltage induced in the coil which is connected to a commutator bar which is about to be commutated by the current collector. A plurality of pole tip elements 11 of magnetic material extending axially of the machine are arranged along the axial sides of the core pole tip portion 10 for providing the magnetic excitation for inducing the latter voltage. As shown in Fig. 1, one of these pole tip elements is arranged along each axial side of the pole core tip and is spaced from the core by non-magnetic material elements 12 extending between the radial side and the axial side of the pole tip elements for providing an effective air gap between the pole tip elements 11 and the pole piece core. The effective air gap can be varied by varying the thickness or the number of non-magnetic elements 12 and the relative air gaps radially and transversely of the pole pieces can also be similarly varied as desired. The entire assembly is adapted to be secured together in any suitable manner, as by a non-magnetic element shown in Fig. 1 as a rivet 13. This arrangement provides for a graded reluctance in the path of the commutating flux and introduces a double air gap in the flux path through the pole tip elements 11, thus reducing the flux available for inducing commutating voltages in the coils which are connected to commutator bars which are about to undergo commutation by the current collector. The construction may be varied as shown in Fig. 2 to provide a pole core tip 10 of the same width as the body of the pole core 9, in which case the non-magnetic spacers 12 may be made as bars.

In some instances, it may be desirable to vary the air gap reluctance still further and this may be done by varying the number of pole piece elements as well as the dimension of the pole tip element. Figs. 3 and 4 illustrate such variations. The tapered pole core tip 10 in Fig. 3 provides for adjusting the different axially extending magnetic elements 14 and 15 and the non-magnetic elements 16 and 17 for different constructions without requiring the use of different dies for making these parts. As shown in Fig. 4, the pole piece core 9 may be formed with a pole tip integral therewith of magnetic material of a reduced transverse section 10. A plurality of axially extending pole tip elements of magnetic material 18 and 19 is arranged along each axial side of the pole core pole tip 10, and these elements are spaced from each other and from the pole piece core by spacing elements 20 and 21 of non-magnetic material to provide an effective air gap between all of these parts of the commutating pole. The various parts of the pole tip are secured together in any suitable manner, as by a non-magnetic rivet 22 which is spaced inwardly from the outer pole face of the pole piece to minimize the eddy current short-circuiting effects of the rivet. By thus spacing apart the pole tip elements and connecting them by a non-magnetic member which prevents the short circuiting of the magnetic flux through the rivet, effective air gaps of varying reluctance are introduced in the magnetic circuit of the pole tip of the commutating pole. The rivet may be electrically connected to the pole tip members to provide a damper circuit (shorted turn) in the pole face or rivet may be insulated, where pole piece 9 is laminated. In addition, the outer axially extending pole tip members 15 and 19 may be made as shown in Figs. 3 and 4, in which the pole face of these pole tipe elements on the outer side of the pole are formed to provide a wider air gap between the pole face and the armature at the outer edge thereof than at the inner edge thereof, while the pole core pole face on the pole tip 10 and on the pole tip elements 14 and 18 is arranged to provide a substantially uniform air gap between the pole faces of these portions of the pole and the armature. In this manner, the air gap reluctance of the machine may be made to conform to substantially any desired value to induce the desired commutating voltages in the coils of the armature winding which pass under the different parts of the commutating pole piece.

While I have illustrated and described particular embodiments of my invention, modifications thereof will occur to those skilled in the art, I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A dynamoelectric machine having an armature provided with a commutator, a commutating pole having a field exciting winding arranged about a pole piece core of magnetic material with a pole tip formed by magnetic material connected by magnetic material to said core portion having a transverse width less than that of the main core portion, pole tip elements of magnetic material extending axially of the machine along both axial sides of said core pole tip portion and spaced from said tip and core, and non-magnetic material between said axially extending elements and said core for providing an effective air gap therebetween.

2. A dynamoelectric machine having an armature provided with a commutator, a commutating pole having a field exciting winding arranged about a pole piece core of magnetic material with a pole tip formed by magnetic material connected by magnetic material to said core portion, pole tip elements of magnetic material extending axially of the machine along both axial sides of said core pole tip portion and spaced from said tip and core, and non-magnetic material between said axially extending elements and said core for providing an effective air gap therebetween.

3. A dynamoelectric machine having an armature provided with a commutator, commutating poles having a field exciting winding arranged about pole piece cores of magnetic material, each of said pole piece cores having a pole tip formed by an integral magnetic material core portion having a transverse width less than that of the main core portion, and pole tip elements of magnetic material extending axially of said machine along both axial sides of said core pole tip portions and spaced transversely and radially of said cores for providing an effective air gap therebetween.

4. In a dynamoelectric machine, an armature provided with a commutator, a commutating pole having a field exciting winding arranged about a pole piece core of magnetic material with a pole tip formed by an integral magnetic material core portion having a transverse width less than that of the main core portion, pole tip elements of magnetic material extending axially of said machine along both axial sides of said core pole tip portion and spaced from said core, non-magnetic material between said axially extending elements and said core for providing an effective air gap therebetween, and non-magnetic means for securing together said axially extending elements and said core.

5. In a dynamoelectric machine, an armature provided with a commutator, a commutating pole having a field exciting winding arranged about a pole piece core of magnetic material with a pole tip formed by an integral magnetic material core portion having a transverse width less than that of the main core portion, a plurality of pole tip elements of magnetic material extending axially of said machine along each axial side of said core pole tip and spaced from said core and from each other, non-magnetic material between said axially extending elements and said core for providing an effective air gap therebetween, and non-magnetic means for securing together said axially extending elements and said core.

6. A dynamoelectric machine having an armature provided with a commutator, commutating poles having a field exciting winding arranged about pole piece cores of magnetic material, each of said pole piece cores having a pole tip formed by an integral magnetic material core portion having a transverse width less than that of the main core portion, a pole tip element of magnetic material extending axially of said machine along each axial side of each of said core pole tips and spaced from said core, and non-magnetic means for securing together said axially extending elements and said cores, said core pole tips having pole faces providing a substantially uniform air gap between said core pole faces and said armature, said axially extending element on each side of each of said pole tips having a pole face providing a wider air gap between said element pole face and said armature at the outer edge thereof than at the inner edge thereof.

7. A dynamoelectric machine having an armature provided with a commutator, commutating poles having a field exciting winding arranged about pole piece cores of magnetic material, each of said pole piece cores having a pole tip formed by an integral magnetic material core portion having a transverse width less than that of the main core portion, a pole tip element of magnetic material extending axially of said machine along each axial side of each of said core pole tips and spaced from said core, non-magnetic material between said axially extending elements and said core of each pole for providing an effective air gap therebetween, and non-magnetic means for securing together said axially extending elements and said cores, said core pole tips having pole faces providing a substantially uniform air gap between said core pole faces and said armature, the outer axially extending element on each side of each of said pole tips having a pole face providing a wider air gap between said element pole face and said armature at the outer edge thereof than at the inner edge thereof.

8. In a dynamoelectric machine, an armature provided with a commutator, a commutating pole having a field exciting winding arranged about a pole piece core of magnetic material with a pole tip formed by an integral magnetic material core portion having a transverse width less than that of the main core portion, a pair of pole tip elements of magnetic material extending axially of said machine along each axial side of said core pole tip and spaced from said core and from each other, non-magnetic material between said axially extending elements and said core for providing an effective air gap therebetween, and non-magnetic means for securing together said axially extending elements and said core, said core pole tip and the inner axially extending element on each side thereof having a pole face providing a substantially uniform air gap between said core pole face and said armature, the outer axially extending element on each side of said pole tip having a pole face providing a wider air gap between said element pole face and said armature at the outer edge thereof than at the inner edge thereof.

THOMAS M. LINVILLE.